US006589130B1

(12) United States Patent
Baginski et al.

(10) Patent No.: US 6,589,130 B1
(45) Date of Patent: Jul. 8, 2003

(54) DRIVING SYSTEM FOR INDUSTRIAL TRUCKS

(75) Inventors: Ralf Baginski, Neetze (DE); Rainer Bruns, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 09/714,629

(22) Filed: Nov. 16, 2000

(30) Foreign Application Priority Data

Nov. 17, 1999 (DE) .......................... 199 55 313

(51) Int. Cl.⁷ ................................ B60K 1/02
(52) U.S. Cl. ................ 477/3; 475/5; 180/65.2
(58) Field of Search ................ 475/5, 7, 8; 477/3, 477/6, 72, 97; 180/65, 65.2, 65.4; 701/51

(56) References Cited

U.S. PATENT DOCUMENTS

| | | | | |
|---|---|---|---|---|
| 5,343,970 A | * | 9/1994 | Severinsky ................ 180/165 |
| 5,558,589 A | * | 9/1996 | Schmidt ........................ 475/5 |
| 5,643,119 A | * | 7/1997 | Yamaguchi et al. ....... 180/65.2 |
| 5,713,425 A | * | 2/1998 | Buschhaus et al. ......... 180/297 |
| 5,823,280 A | * | 10/1998 | Lateur et al. ................ 180/165 |
| 5,823,282 A | * | 10/1998 | Yamaguchi ................ 180/65.2 |
| 6,007,443 A | * | 12/1999 | Onimaru et al. ........... 180/65.2 |
| 6,044,922 A | * | 4/2000 | Field ......................... 180/65.2 |
| 6,110,066 A | * | 8/2000 | Nedungadi et al. ............ 475/5 |
| 6,155,365 A | * | 12/2000 | Boberg ...................... 180/65.2 |
| 6,251,037 B1 | * | 6/2001 | Baumgaertner et al. ... 180/65.2 |
| 6,283,239 B1 | * | 9/2001 | Tsukamoto et al. ........ 180/65.2 |
| 6,308,794 B1 | * | 10/2001 | Oppitz ....................... 180/54.1 |

FOREIGN PATENT DOCUMENTS

| | | |
|---|---|---|
| DE | 43 21 768 | 1/1995 |
| DE | 197 47 459 A1 | 5/1999 |
| DE | 198 03 160 C1 | 5/1999 |
| EP | 0 908 343 A2 | 4/1999 |
| GB | 2 335 404 | 9/1999 |

* cited by examiner

*Primary Examiner*—Rodney H. Bonck
*Assistant Examiner*—David D. Le
(74) *Attorney, Agent, or Firm*—Vidas, Arrett & Steinkraus, P.A.

(57) ABSTRACT

A driving system for an industrial truck, comprising: a combustion engine, an electric motor fed from a battery, a gear assembly the inputs of which are coupled to the shaft of the combusion engine and the electric motor and the output of which is coupled to the driven shaft of the driving system.

9 Claims, 1 Drawing Sheet

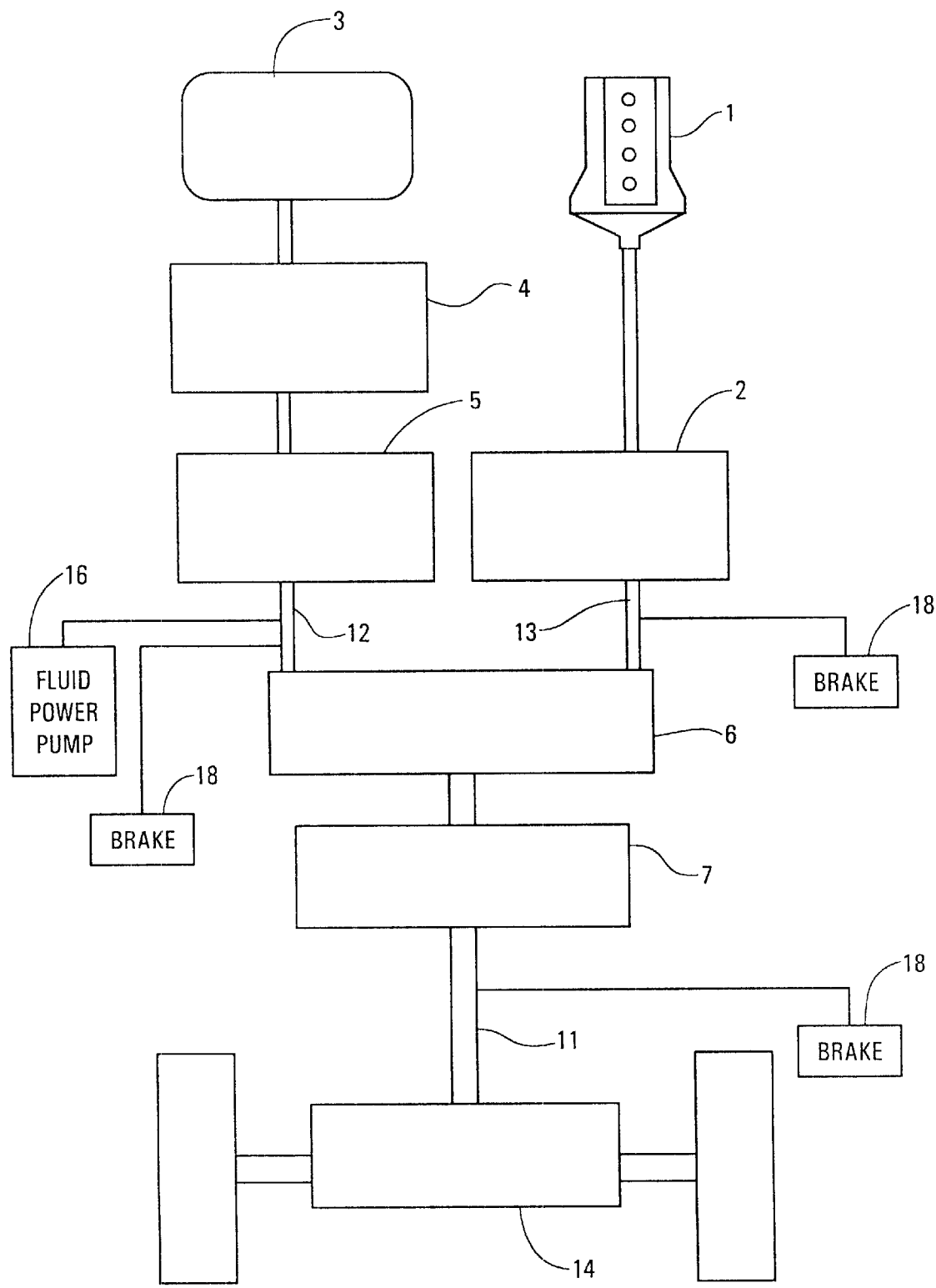

DRIVING SYSTEM FOR INDUSTRIAL TRUCKS

CROSS-REFERENCE TO RELATED APPLICATIONS

Not Applicable

STATEMENT REGARDING FEDERALLY SPONSORED RESEARCH

Not Applicable

BACKGROUND OF THE INVENTION

Combustion engine driven industrial trucks require a transmission to provide the desired torque at the desired speed. It is known to use a change-speed mechanism including a clutch for this purpose. However, such a system is unacceptable for industrial trucks. Therefore, it is also known in driving systems to provide hydrodynamic transducers in combination with single-step transmissions and multi-step transmissions. This solution proves disadvantageous at slow driving speeds because efficiency is not good in this operating condition. Furthermore, a clutch function is required to independently operate the lifting function.

The disadvantages of the hydrodynamic solution are not encountered in a hydrostatic driving branch. However, what opposes the relatively high efficiency when driving at a slow speed is the bad efficiency at faster driving speeds. Another drawback is the relatively large construction expenditure due to the high hydraulic pressures up to 400 bar and the system's susceptibility to defects, particularly with regard to leakage.

Finally, in the industrial truck field, it is also known to perform the transmission of forces by means of an electric transmission. In an electric transmission, all the energy generated by the combustion engine is converted into electric energy by means of a generator. Then, this electric energy is reconverted into mechanical energy by means of an electric motor. The drive controls for electric motors are capable of adjusting any gear ratios between the generator and the electric motor. Hence, a system of this type has the advantage of being regulable particularly well. A drawback, however, are the low efficiencies due to the high losses in the controls and electric machines.

The existing solutions in driving combustion engine operated industrial trucks, as a rule, involve considerable energy losses in certain operating situations. Furthermore, the existing systems are incapable of returning energy in braking. Furthermore, emissionless operation is impossible, which nearly rules out the use of such industrial trucks in closed rooms. Another disadvantage of the former driving systems lies in the fact that the components of the systems require to be designed for peak loads. The mean load acting on the components, however, clearly is below such values. Thus, a large construction expenditure is incurred that is not needed for the mean.

DE 198 03 160 has made known a two-branch driving system for automobiles which is intended to better meet the requirements to power-driven vehicles in a stop-and-go operation in conurbations. The known system is a so-called hybrid drive with a first electric machine disposed on a driving shaft of the hybrid drive and a second electric machine the two of which are always operable as a generator and an electric motor and which are coupled to each other and to the combustion engine via a two-branch gear transmission. The second electric machine is positioned on a shaft with which a rotary brake is associated which is controllable in dependence on the driving condition of the power-driven vehicle and by which the respective shaft can be located. It is by means of such a driving system that a more favourable efficiency behaviour of power-driven vehicles and a long service life of the drive are intended to be ensured.

DE 197 47 459 has made known a two-branch driving system for tractors and agricultural machinery which has a mechanical drive and an adjustable hydrostatic transmission. This driving system is intended to increase efficiency via the mechanical branch. In addition, a driving system of this type may obtain a higher speed as compared to simple hydrostatic driving systems. The known driving system, as a rule, does not need the same forward movement and reverse movement speed as is the case in industrial trucks. The earlier described hydrid driving system does not make it possible either to reverse at a maximum speed.

It is the object of the invention to provide a driving system for industrial trucks that enables a large range of speed adjustability at a uniformly good efficiency and does not limit the manoeuvrability of the vehicle. In addition, one embodiment is also intended to make possible emissionless operation in closed rooms at least temporarily.

BRIEF SUMMARY OF THE INVENTION

The inventive driving system for industrial trucks provides a two-branch system wherein the primary branch provides a mechanical no-clutch connection between the combustion engine and a gear assembly whereas an electric motor is coupled with no clutch to the gear assembly in a secondary branch.

In another aspect of the invention, if necessary, a gear ratio transmission may be provided which approximately is incorporated into the combustion engine branch. It may be designed as a transmission with a fixed gear ratio, a adjustable transmission or a change-speed transmission. The second or secondary driving branch has a battery, a drive control, and an electric motor. The two driving branches are led to combine in a gear assembly. The gear assembly may be a differential or planetary mechanism.

For a reversal of the direction of travel, it may be opportune to integrate a change-over transmission in the driving system. Such a change-over transmission, however, may also be unnecessary because the direction of travel can be changed by reversing the sense of rotation of the electric motor.

Preferably, a governor is provided in order to provide a speed regulation according to a desired-value signal. The governor controls the electric motor, the combustion engine, and any brakes that might exist. The desired-value transmitter actuated by the vehicle operator produces a desired speed value which, for a regulation of the drive, is compared to the respective actual value. By actuating the desired-value transmitter or another appropriate operating device (e.g. a switch for the direction of travel or a dual pedal), the vehicle driver informs the governor in which direction and at which speed he wishes to drive. If the vehicle is at stoppage at this point the change-over transmission either is shifted to the gear ratio belonging to the desired direction of travel following an actuation of the operating device or the driving behaviour is imparted to the electric motor by an appropriate signal. Shifting the change-over transmission preferably is not done directly by the driver, but the governor in dependence on the actual state of travel and the position of the operating device. This ensures that the change-over transmission is shifted only if the input and output shafts are at stoppage or at least at an approximate stoppage (with the designation "input and output shafts" referring to the change-over transmission rather than to the driving system here). This permits to dispense with a mechanism for synchronizing the numbers of revolutions and, moreover, no shocks will occur and no wear will result owing to the shifting operation. If the direction of travel is reversed by the electric motor there will no problems whatsoever in this respect.

In the inventive driving system, if the vehicle is intended to be stopped, but the combustion engine has been started by means of the electric motor and is rotating at an idle speed the electric motor has to rotate at the same speed as the combustion engine, but in an inverse sense. For a start-up, the electric motor is braked in a counterclockwise sense of rotation. Thus, energy is generated which can be fed to the battery. An appropriate connection requires to be provided to this end. If the vehicle is sped up further the electric motor may also drive the vehicle actively. At this point, energy requires to be drawn from the battery. In the invention, the vehicle may also be driven exclusively by electricity, for example, in order not to emit any exhaust gases in roof-covered rooms. Conversely, the vehicle may also be driven exclusively by a combustion motor.

For the rest, the combustion motor may be used for charging the battery via the electric motor and the electric motor may serve as a starter for the combustion engine. In order to clearly control the flux of energy it may be required to incorporate single or several brakes.

The inventive systems has a series of advantages. It is of a simple structure since an adjustable transmission is unnecessary. The combustion motor need not be designed for a maximum power. The dynamo and the starter for the combustion engine may be omitted. A further advantage is that the braking energy can be recovered in part. In addition, it is possible to drive with no exhaust gases.

BRIEF DESCRIPTION OF THE SEVERAL VIEWS OF DRAWINGS

The invention will now be explained in detail with reference to an embodiment shown in a drawing.

The single FIGURE shows the connection diagram of a driving system according to the invention.

DETAILED DESCRIPTION OF THE INVENTION

A combustion engine 1 drives a first shaft into which a gear ratio transmission is incorporated. The gear ratio transmission may be a change-speed transmission, but is not definitely necessary as will become obvious later. The shaft 13 is coupled to the input of a gear assembly 6. The gear assembly 6 may be a differential or planetary mechanism.

An electric motor 5 is fed from a battery 3 via a control 4. Its shaft 12 constitutes the further input for the gear assembly 6. The output of the gear assembly 6 is constituted by the driven shaft 11 into which a change-over transmission 7 is incorporated. This one may be omitted as will be explained later. The driven shaft 11 is the input shaft of a differential 14 which is coupled to the driving wheels of the vehicle (not shown), especially those of the industrial truck. If only one wheel of the industrial truck is driven the differential 14 may be omitted.

The control 4 may also include a governor which regulates the speed of the electric motor 5 and the combustion engine 1 as given by a desired-value transmitter actuated by the vehicle operator. To this end, a sensor system (not shown) is required which measures the speeds of the shafts 12, 13, and 11 for the generation of an appropriate setting signal for the electric motor 5 and the combustion engine 1. If a change-over transmission is used for the reversal of the sense of rotation the governor may also be used for shifting the change-over transmission, which is a transmission preferably adapted to be actuated when under a load to enable it to be shifted when the input and output shafts of the transmission are at an approximate stoppage.

Further, an appropriate output device may be provided for driving a fluid power pump 16. For example, a transmission for driving the fluid power pump may be coupled to the shaft 12 or 13. The fluid power pump serves for the supply of hydraulic functions of the vehicle, e.g. a hydraulic lifting device etc.

If the vehicle is intended to be stopped, but the combustion engine 1 has been started by means of the electric motor 5 and is rotating at an idle speed the electric motor 5 has to rotate at the same speed as the combustion engine 1, but in an inverse sense. For a start-up, the electric motor 5 is braked in a counterclockwise sense of rotation. Thus, the driving shaft 11 is rotated via the gear assembly 6. The energy thus generated by the electric motor 5 may be used for charging the battery 3. If the vehicle is intended to be sped up further the electric motor 5 may also drive the vehicle actively. At this point, energy requires to be drawn from the battery 3. As can be seen the vehicle may also be driven exclusively by electricity or exclusively by a combustion engine. The combustion engine 1 may also be used for charging the battery via the electric motor 5.

To clearly control the flux of energy it may be required to associate a brake 18 each with the shafts 12, 13, and 11.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A driving system for an industrial truck, comprising:
   a combustion engine (1);
   an electric motor (5) fed from a battery (3);
   a collection gear having two inputs which are coupled clutch free to shafts (12, 13) of the combustion engine (1) and of the electric motor (5) and one output, and being formed by a planetary gear assembly (6), the output thereof being coupled to a change-over transmission which is incorporated in the course of a driven shaft, the change-over transmission being adapted to switch under load and providing for a reversal rotation.

2. The driving system according to claim 1, characterized in that an adjustable electric, hydrostatic, hydrodynamic, pneumatic or mechanical transmission is provided.

3. The driving system according to claim 1, characterized in that the driven shaft of the electric motor (5) or the combustion engine (1) drives a fluid power pump for the supply of hydraulic functions in the vehicle.

4. The driving system according to claim 1, characterized in that a gear ratio transmission (2) is incorporated into the branch of the combustion engine (1).

5. The driving system according to claim 4, characterized in that the gear ratio transmission (2) is an adjustable transmission or a change-speed transmission.

6. The driving system according to claim 1, characterized in that a governor is provided which controls the operation of the electric motor (5) and the combustion engine and a sensor system is provided which detects the speeds of one or more of the shafts (12, 13, 11), an operating element presets a desired value and, a signal for the direction of travel, and the governor adjusts the electric motor (5) and the combustion engine (1) and, the adjustable transmission or change-speed transmission according to the deviation from the governed state.

7. The driving system according to claim 6, characterized in that the change-over transmission (13) which can be shifted when under a load is shifted by the governor when the input and output shafts thereof are at an approximate stoppage.

8. The driving system according to claim 1, characterized in that a brake is associated with the shaft of the combustion engine (1) and/or the electric motor (5) and/or the driven shaft (11).

9. The driving system according to claim 8, characterized in that an actuation of the brake is controlled by the governor.

\* \* \* \* \*